US008627507B2

(12) United States Patent
Stasi et al.

(10) Patent No.: US 8,627,507 B2
(45) Date of Patent: Jan. 7, 2014

(54) SYSTEM AND METHOD FOR MULTIMEDIA DATA VALIDATION

(75) Inventors: Christopher Stasi, Sherman Oaks, CA (US); Kelly Perdue, Hermosa Beach, CA (US); Dom Stasi, Studio City, CA (US)

(73) Assignee: Vubiquity Entertainment Corporation, Reston, VA (US)

( * ) Notice: Subject to any disclaimer, the term of this patent is extended or adjusted under 35 U.S.C. 154(b) by 266 days.

(21) Appl. No.: 12/409,374

(22) Filed: Mar. 23, 2009

(65) Prior Publication Data
US 2009/0222930 A1 Sep. 3, 2009

Related U.S. Application Data

(62) Division of application No. 11/182,724, filed on Jul. 15, 2005, now abandoned.

(51) Int. Cl.
| H04N 7/16 | (2011.01) |
| H04L 29/06 | (2006.01) |
| H04L 9/32 | (2006.01) |
| H04N 7/167 | (2011.01) |
| G06F 15/16 | (2006.01) |
| G06F 15/173 | (2006.01) |
| H04N 7/20 | (2006.01) |

(52) U.S. Cl.
USPC ............. 726/30; 713/165; 713/168; 380/201; 380/229; 380/231; 380/232; 380/233; 709/201; 709/217; 709/224; 709/229; 725/1; 725/25; 725/63

(58) Field of Classification Search
USPC ............... 726/30, 26; 713/165, 168; 380/201, 380/229, 231–233; 709/201, 217, 224, 229; 725/1, 25, 63
See application file for complete search history.

(56) References Cited

U.S. PATENT DOCUMENTS

| 4,671,772 A | 6/1987 | Slade et al. |
| 4,863,384 A | 9/1989 | Slade |

(Continued)

FOREIGN PATENT DOCUMENTS

| EP | 1 675 318 A | 6/2006 |
| WO | WO 02/43396 A | 5/2002 |
| WO | WO 2004002146 A1 | 12/2003 |
| WO | WO 2005027439 A1 | 3/2005 |

OTHER PUBLICATIONS

International Search Report mailed May 25, 2007 in PCT/US06/26379.

(Continued)

*Primary Examiner* — Aravind Moorthy
(74) *Attorney, Agent, or Firm* — Smith, Gambrell & Russell, LLP

(57) ABSTRACT

There is disclosed a media file distribution system and method. An asset management and delivery system and method for the distribution of digital files and data is provided. There are two major functions, with sub-functions within each. The system first serves as a fully automated management system for a company involved in video/file distribution, such as in video on demand (VOD) or other digital file industries. The system can ingest, prepare, schedule, transmit, track and report on any aspect of the business chain. Secondly, it also serves as a product for both content providers and recipients to be able to view, manage and run their entire content offering remotely from anywhere through the Internet.

19 Claims, 11 Drawing Sheets

(56) References Cited

U.S. PATENT DOCUMENTS

| | | | |
|---|---|---|---|
| 5,099,422 A | 3/1992 | Foresman et al. | |
| 5,123,089 A | 6/1992 | Beilinski et al. | 709/237 |
| 5,550,735 A | 8/1996 | Slade et al. | |
| 5,825,876 A | 10/1998 | Peterson, Jr. | 705/52 |
| 5,844,595 A | 12/1998 | Blatter et al. | 455/83 |
| 6,104,705 A | 8/2000 | Ismail et al. | 370/260 |
| 6,105,066 A | 8/2000 | Hayes, Jr. | 709/226 |
| 6,269,275 B1 | 7/2001 | Slade | |
| 6,304,906 B1 | 10/2001 | Bhatti et al. | |
| 6,401,238 B1 | 6/2002 | Brown et al. | 717/177 |
| 6,405,215 B1 | 6/2002 | Yaung | 1/1 |
| 6,516,348 B1 | 2/2003 | MacFarlane et al. | 709/224 |
| 6,760,721 B1 | 7/2004 | Chasen et al. | 1/1 |
| 6,769,127 B1 | 7/2004 | Bonomi et al. | 725/39 |
| 6,925,469 B2 | 8/2005 | Headings et al. | 707/102 |
| 6,986,158 B1 | 1/2006 | Terui et al. | 725/116 |
| 7,020,888 B2 | 3/2006 | Reynolds et al. | 725/34 |
| 7,483,879 B2 | 1/2009 | Chang et al. | 1/1 |
| 7,921,448 B2 | 4/2011 | Fickle et al. | 725/95 |
| 8,250,663 B2 | 8/2012 | Risan et al. | |
| 8,255,950 B1 | 8/2012 | Wick et al. | |
| 8,275,746 B2 | 9/2012 | Vadavia et al. | |
| 2001/0003831 A1 | 6/2001 | Boland | 709/226 |
| 2001/0034839 A1* | 10/2001 | Karjoth et al. | 713/190 |
| 2002/0038359 A1 | 3/2002 | Ihara et al. | 709/219 |
| 2002/0078449 A1 | 6/2002 | Gordon et al. | 725/41 |
| 2002/0083182 A1 | 6/2002 | Alvarado et al. | 709/231 |
| 2002/0116517 A1 | 8/2002 | Hudson et al. | 709/231 |
| 2002/0129371 A1 | 9/2002 | Emura et al. | 725/61 |
| 2002/0152318 A1 | 10/2002 | Menon et al. | 709/231 |
| 2003/0009553 A1 | 1/2003 | Benfield et al. | 709/224 |
| 2003/0009579 A1 | 1/2003 | Kawai et al. | 709/231 |
| 2003/0023757 A1 | 1/2003 | Ishioka et al. | 709/246 |
| 2003/0030750 A1* | 2/2003 | Hoarty et al. | 348/461 |
| 2003/0093530 A1 | 5/2003 | Syed | 709/226 |
| 2003/0110501 A1 | 6/2003 | Rafey et al. | 725/46 |
| 2003/0187932 A1 | 10/2003 | Kennedy | 709/205 |
| 2003/0204614 A1 | 10/2003 | Spio | 709/231 |
| 2003/0229898 A1 | 12/2003 | Babu et al. | 725/87 |
| 2004/0088730 A1 | 5/2004 | Gopalan et al. | 725/93 |
| 2004/0103120 A1 | 5/2004 | Fickle et al. | 707/104.1 |
| 2004/0143764 A1* | 7/2004 | Kaleedhass | 713/201 |
| 2004/0186993 A1 | 9/2004 | Risan et al. | |
| 2004/0194131 A1 | 9/2004 | Ellis et al. | 725/34 |
| 2004/0199809 A1* | 10/2004 | Hanam et al. | 714/4 |
| 2004/0254940 A1 | 12/2004 | Brush | 707/100 |
| 2004/0255335 A1 | 12/2004 | Fickle et al. | 725/135 |
| 2005/0050218 A1 | 3/2005 | Sheldon | 709/231 |
| 2005/0120209 A1* | 6/2005 | Kwon et al. | 713/161 |
| 2005/0125660 A1* | 6/2005 | Raciborski | 713/161 |
| 2005/0160418 A1* | 7/2005 | Jeong et al. | 717/173 |
| 2005/0228858 A1 | 10/2005 | Mizutani et al. | 709/201 |
| 2006/0069720 A1 | 3/2006 | Shibutani | 709/203 |
| 2006/0156066 A1* | 7/2006 | Pisarski | 714/38 |
| 2006/0170759 A1* | 8/2006 | Roever et al. | 348/14.03 |
| 2007/0033609 A1 | 2/2007 | Dei | |
| 2007/0038717 A1 | 2/2007 | Burkholder et al. | |
| 2007/0060096 A1 | 3/2007 | Hayakawa | 455/403 |
| 2007/0061835 A1 | 3/2007 | Klein et al. | 725/25 |
| 2007/0239609 A1 | 10/2007 | Fish et al. | |
| 2008/0027792 A1 | 1/2008 | Wu | |
| 2010/0175100 A1 | 7/2010 | Ogasawara | 725/114 |
| 2010/0254536 A1 | 10/2010 | Dellow | 380/278 |
| 2012/0232916 A1 | 9/2012 | Vadavia et al. | |

OTHER PUBLICATIONS

Written Opinion of the International Searching Authority mailed May 25, 2007 in PCT/US06/26379.
Non-Final Office Action dated Apr. 27, 2012 of corresponding U.S. Appl. No. 12/407,715.
U.S. Patent Publication No. 2007/0239609.
U.S. Patent Publication No. 2007/0088660.
U.S. Patent Publication No. 2007/0033609.
U.S. Patent Publication No. 2005/0097169 Al.
Stasi, Dom, "VOD: Ready to Pop; A heavenly solution? Satellite-based approach reduces cost, enhances reliability", CED, Jul. 2000, 5pp.
Mukherjee D. et al., "Structured Scalable Meta-Formats (SSM) for Digital Item Adaptation", Proceedings of the SPIE—The International Society for Optical Engineering, SPIE, Jan. 22, 2003, 20 pgs., vol. 5018; Bellingham, WA.
Final Office Action dated Nov. 19, 2012 received in U.S. Appl. No. 12/407,715.
non-final Office Action dated Nov. 26, 2010 received in U.S. Appl. No. 12/407,715.
non-final Office Action dated Oct. 29, 2013 received in U.S. Appl. No. 12/407,715.

* cited by examiner

FIG. 8

SYSTEM AND METHOD FOR MULTIMEDIA DATA VALIDATION

CROSS-REFERENCE TO RELATED APPLICATION(S)

This is a divisional of U.S. application Ser. No. 11/182,724, filed on Jul. 15, 2005. The contents of which are incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates generally to a media file distribution system and method, and more particularly, to a system and methodology that provides end-to-end management of distribution of a media asset.

BACKGROUND OF THE INVENTION

The task of distributing media files from network content providers to recipient media front-end customers, such as cable providers, and the like (collectively called "recipient sites" herein), has become a complex process. This is mainly due to competing interests in file formats, transmission protocols, processing requirements, program guide entry format, and various other parameters configured according to different standards as amongst the various content and service providers involved in the distribution process. Accordingly, inordinate amounts of time are now spent converting formats in order for content providers, distributors, and the recipient site customers to manipulate and modify media files throughout the distribution process in order to comply with their diverse system requirements.

The typical media file is a media/digital file for use in video playback, gaming, or any other digital medium. Such a file is sent over satellite, the Internet, or other network, to those involved in distribution and final presentation to the public from the front end or to the recipient site customers. A data control file arrives with the media file which data file must be constantly modified with each conversion to a new system. Current systems typically transmit the control file in one of three ways. The first is to target a unique metadata control file to each receiving site, thereby requiring N number of files for N sites. The second way is to send one generalized file to all receiving sites and then have a site-specific transformation occur at each site dictated by information stored at each site that is triggered by the general information in the control file. A third way to is to send one control file to all receiving sites and then to require each site to process the one format in that control file to be used, but this approach precludes any site specificity. In each of these approaches limitations are necessarily imposed on, for example, the amount and types of different properties that can be applied to an ingested media file, and its distribution characteristics. Further, multiple systems are required, increasing the working time and likelihood of errors, as well as causing synchronization issues. For example, these approaches can be characterized by the frequent failure of in-bound value readers to pass data that is expected by site-specific transform mechanisms. Users in these media distribution system are then forced to manually adjust all of the media assets within the schedule accordingly, while continuing to monitor any additional changes that might be introduced by any of the entities that play a role in, or that otherwise involved in the overall media distribution system.

In summary, no current system performs end-to-end automated ingestion and monitoring of media assets.

BRIEF SUMMARY OF THE INVENTION

Briefly, and in general terms, the claimed invention resolves the aforementioned and other problems by providing a media file distribution data system and method. A single media file is used for distribution to two or more recipient sites. A first recipient site has first parameter requirements for processing the media file, and a second recipient site has second parameter requirements for processing the media file that are different from the first parameter requirements. A first set of parameters is included in the media file that meets the first parameter requirements. Further, a second set of parameters is included in the media file that meets the second parameter requirements. In this regard, the first set of parameters is for use during distribution to the first recipient site, and the second set of parameters is for use during distribution to the second recipient site.

In accordance with another aspect of a system and method for automated processing of a media file for distribution. In the distribution system and method, a media file is received for distribution. The media file has an asset type, and is validated according to one or more requirements according to the asset type. As a result of validating, one or more errors are produced. These errors are corrected by applying a rules application to the media file. The media file is then distributed.

In accordance with another aspect of a system and method for automated processing of a media file for distribution to a recipient site. A media file is provided for distribution. The multi-media file is processed to produce data parameters for distribution. A receiving status of the recipient site is checked. One or more of the data parameters are changed according to the receiving status of the recipient site. For example, according to one embodiment, the data parameters are changed according to a set or rules defined in a contract with the recipient site. The media file is then distributed to the recipient site according to the data parameters. Further, an interface is provided so as to allow an operator of the recipient site to view status information regarding distribution of the media file.

In accordance with another aspect of a preferred embodiment, the claimed invention is a system and method for optimizing distribution of a media file to a plurality of recipient sites. A receive status of a first recipient site is checked, thereby producing a first status check result. A receive status of a second recipient site is checked, thereby producing a second status check result. Based on the first status check result and the second status check result, a rules engine is applied to determine a priority for distribution to the first recipient site respective of the second recipient site. The media file is then distributed to the first recipient site and the second recipient site according to the determined priority.

In accordance with another aspect of a preferred embodiment, the claimed invention is a system and method for providing connectivity in a media file distribution system. The system includes a data store, a portion of which is for storing a media file received from a content provider. A database in the data store contains editable parameters for distribution to the recipient site. An interface to the database allows the content provider to edit the parameters. The interface further allows the recipient site to edit the parameters. A distribution "sub system" is configured for distributing the media file according to the parameters.

In accordance with another aspect of a preferred embodiment, the claimed invention is a system and method for providing interactive program guide entry for a media file. A distribution hub stores a media file received from a content provider for distribution to a recipient site. An interface to the distribution hub allows editing of program guide data for the media file. The interface stores the program guide data to the media file. The interface further allows the content provider to view the program guide data for the media file. In one embodiment, the interface further allows the content provider to edit the program guide data, and to set parameters regarding editing of the program guide data by the recipient site.

In accordance with another aspect of a preferred embodiment, the claimed invention is a system and method for providing a multi-port catcher. The system includes a computer, a data store, and a network connection for connecting the computer to a network. In one aspect of this embodiment, a partition application is executed on the computer to partition the computer into multiple partitions. A catcher application executes in each partition. Each catcher application is capable of receiving a separate media file over the network connection, simultaneously. Each media file is stored in the data store. The system may use a plurality of catcher applications, wherein, for example, a first partition executes a first catcher application, and a second partition executes a second catcher application. Therefore, the first catcher application can use a different protocol than the second catcher application. In this sense, the partition application is configured to divide processing of a processor of the computer into virtual computers, such that each of the media files are received by a partition executing in one of the virtual computers.

In one embodiment, one of the partitions is configured as a content provider itself, such that one or more of the media files can be provided internally from the data store into the catcher without using a separate computer to provide the one or more media files to the catcher. In this or other embodiments, one of the partitions is further configured as a gateway computer to provide gateway processing for each of the other partitions.

In accordance with another aspect of a preferred embodiment, the claimed invention is a system and method for administrating a contract for distribution of a media file. A media file is received from a content provider, after which, contract parameter data is entered into the media file according to a contract between the content provider and a recipient site. Metadata is calculated for the media file based on the contract parameter data. The media file is then distributed to the recipient site. In one embodiment, by way of example, and not by limitation, the contract data includes price limitations that the recipient site can charge for viewing of the media file. As another example, and not by limitation, the contract data includes time limitations defining limitations regarding a time that the recipient site can present the media file.

BRIEF DESCRIPTION OF THE DRAWINGS

FIG. 8 is a screen shot from an example package profile editing interface for a content provider for the system and method of FIG. 1;

DETAILED DESCRIPTION OF THE PREFERRED EMBODIMENTS

Figure 1:
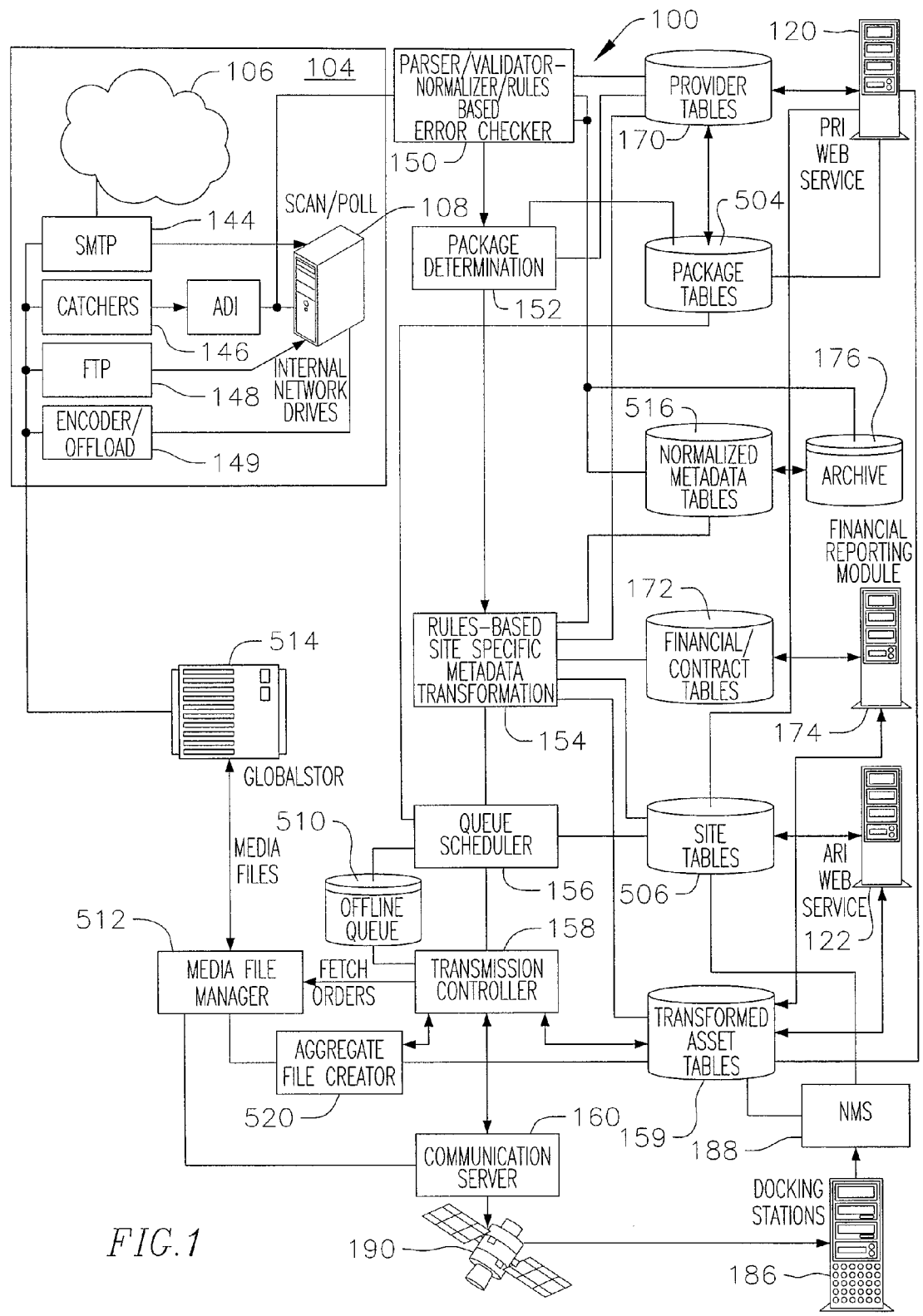
FIG. 1 is network block data flow diagram illustrating components and steps performed in a media file distribution system and method according to one embodiment.

Referring now to the drawings, wherein like reference numerals denote like or corresponding parts throughout the drawings and, more particularly to FIGS. 1-12, there is shown one embodiment of a media file distribution system in accordance with the claimed invention. Specifically, the claimed invention provides an asset management and delivery system for the distribution of digital files and data. The system has two major functions, with sub-functions within each. The system first serves as a fully automated management system for a company involved in video/file distribution, such as in video on demand (VOD) or other digital file industries. The system can ingest, prepare, schedule, transmit, track and report on any aspect of the business chain. Secondly, it also serves as a product for both content providers and recipient sites to be able to view, manage and run their entire content offering remotely from anywhere through the internet.

There are three typical users for the system. One is any company or individual distributing digital media and associated information. They would typically use the system to automate distribution. Another user is a content provider in the digital media space. This entity can use the system to enter assets, track them at their destination, and receive reports on them. Another typical user is a receiving client or customer who can use the system to view and alter their assets, and schedule, monitor or change their receiving equipment setup or architecture. With each "sub module" described as follows, the usefulness of the claimed system will become apparent to those skilled in the art.

In one embodiment, the claimed invention has the ability to ingest media files and data, prepare them for transmission across the media industry, localize all the applicable data by customer and track, and reconcile the distribution of that data, all within the same system.

With reference to FIG. 1, the structure of the system 100 includes a series of components and functions. The first component is for asset ingestion into the system. Digital files and associated data are entered into the system in a variety of ways such as through standard file transfer protocol (FTP) or satellite transmission over a satellite link such as an outgoing satellite link 190 used for distribution. This data is then scanned for compliance to formats, quality, and expected parameter values, process block 150. The expected parameter values that are specific to each content provider are stored in provider tables 170, wherein the system compares the stored provider specific expected parameter values to those received with each media asset. Media package specific expected parameters are stored in package tables 504, wherein the system further compares those package specific expected parameters to the parameter values received with each media asset. To the extent that any parameters need to be added or are missing, the system calculates those parameter values based on data stored in metadata tables 516. Such calculated metadata may be archived into an archive table 176 for later review, or backup.

The digital files are then transformed into customer-specific formats, a process that begins at process block 152. In a package determination process, the metadata of the media file is processed and added to the file. The system 100 has the unique ability to be ingestion-format agnostic, meaning that, however the content provider would like to enter files into the system, it can recognize the interface type automatically, and perform the appropriate protocol to ingest the file, process block 154. The data is then queued, process block 156, and scheduled for transmission over any medium (e.g. over the satellite link 190, the Internet, and such), and prepared for that transmission. Before distribution, reporting information regarding each file to be transmitted is stored in transformed asset tables 159.

The actual distribution is then performed, process block 158. In the example of FIG. 1 transmission of the media files 190 occurs via satellite 190 through a communication server 160, to docking stations 186 at the recipient site head ends. After distribution, the media files are tracked, reconciled, and reported on, through a network management system (NMS) 188. This comprehensive approach enables any one area of the system 100 to affect properties and functionality of any or all of the other components, and to optimize the entire end-to-end performance of the system.

The system 100 enables users to author metadata (the control and information file for digital files in the video on demand environment) for video assets and export them for use. In one embodiment, the metadata affects the transmission of the media assets from content providers to recipient sites, such as multiple system operators (MSOs) receiving video-on-demand content. The system also performs gateway functionality, which in the context of one embodiment, includes aggregation of files from multiple transmission systems through one point of entry. This comprehensive control gives the system the unique capability of allowing any and all formerly disparate or disconnected functions of the distribution chain to interact with each other, thereby optimizing all functions and capabilities of the entire network and allowing file handling based on data from the entire distribution system 100.

In one sense, the system 100 functions as an automated file recipient system for content distributors to aggregate data and digital media files. These media files are ingested into the system 100 through an automated ingest subsystem, processing block 104. Once received the media files are manipulated and scheduled for distribution to the recipient sites or customers of the content providers, such as local cable companies and the like. The system 100 also allows those same content providers to author the parameter data for their media files directly through a provider remote interface sever (PRI) 120. In one embodiment, the parameter data is edited directly into the system or provided pre-formed into a folder on the network in order to be automatically ingested with the media file. Once entered, this parameter data is immediately transformed into data specific to the content recipient sites that will receive it later.

In another sense, the system 100 provides the ability for all the customers to view the media file and status data through the Internet at all points in the distribution chain, using an affiliate remote interface server (ARI) 122. The customers can log into the system over the web through the ARI 122, and view relevant media file data, not only in the original form in which it was entered, but also in the form after transformation in the system. For example, with respect to program guide data, parameter data can be viewed in a form, as it will appear when recipients display it to their cable or media viewers.

Figure 2:
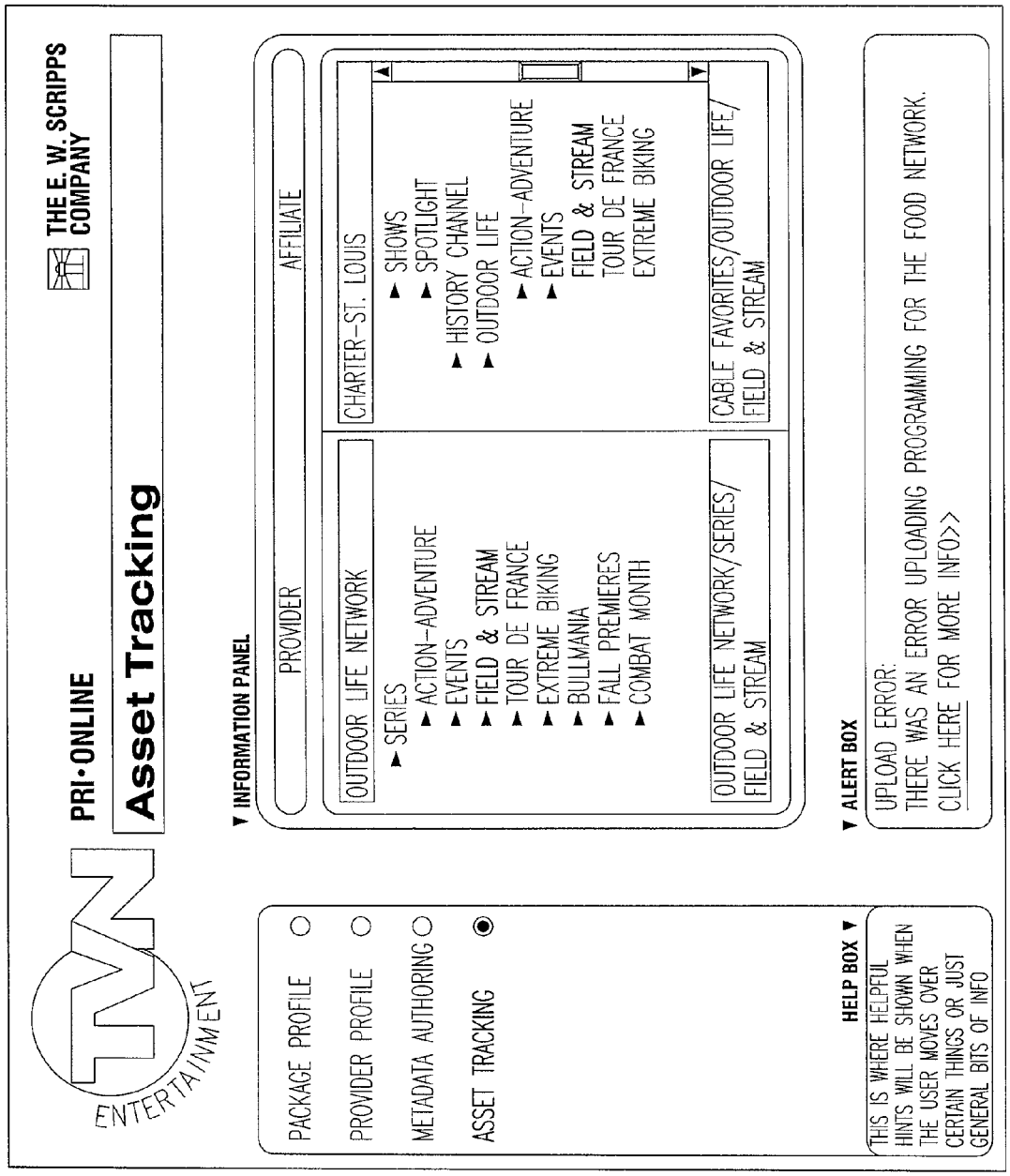
FIG. 2 is a screen shot from an example interface for a content provider for the system and method of FIG. 1.

In one example, a content provider logs into the system to view the properties of their media file that are provided to a recipient, for example, a cable MSO. These properties include the price for viewing the media file from the affiliate, times or available times for viewing the media file, overrides to certain values found in the control metadata, such as provider or distributor information, and financial information, such as revenue splits. The providers can also view the interface the content recipients display to their viewers. FIG. 2 shows an example screen shot from PRI 120.

Figure 3:
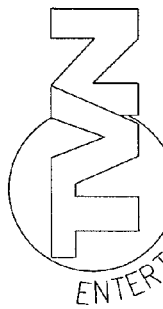
FIG. 3 is a screen shot from an example interface for a content recipient site for the system and method of FIG. 1.

The media recipients can log in through the ARI 122, and can also review content available in the system. Through the ARI 122, media recipients can sign up to receive content, thereby added the media recipient to distribution lists for media files. The recipients can also view the media file content before making decision on which media files to receive. An example screen from the ARI 122 used to perform these functions is shown in FIG. 3.

In one embodiment, an example scenario with respect to ingestion and processing of a media file follows. At a network connection 106 in FIG. 1, a file first arrives at an ingestion server 108 without any manual intervention. The network connection 106 preferably comprises any high speed internet connection, such as a T1, T2 or high-end DSL connection. The ingestion server 108 reads the file's parameters, which are entered by the content provider, and the type of file is determined.

After initially receiving the media file, in one embodiment, a media file manager 512 manages processing of the file. For example, the media manager 512 can determine that the parameters of a media file require it to move immediately to the front of a satellite distribution queue, process block 156. The parameters read are a part of the corresponding metadata received with the file from the content provider. Certain fields are present in that data, such as the content tier, which tells the system the file type, which defines processing rules that are applied to the file in process block 154. In this step, parameters related to one or more contracts between the recipient and the content provider are added to the aggregate file, as described below with respect to FIGS. 11-12. The contract parameters may be determined from contract data in financial/contract tables 172. At that time, financial reports regarding the file are calculated and stored in a financial reporting module 174.

Since, in this example, the parameters indicate that immediate processing is necessary, the file is then moved across an internal system 100, transmitted immediately, and reported on immediately so that all the recipient sites have it as quickly as possible.

In another example, a media file that arrives late automatically triggers a change in any previously scheduled transmission date within its parameters. This change flows through the entire system where parameters for that media file are kept. The system changes the availability date for that media file within its associated metadata. That change affects any financial projections, which are also automatically figured from the same data.

Further in another example, a change in receiving status/capability of one of the remote recipient sites triggers a change in the expected transmission schedule should that recipient site be part of an upcoming scheduled distribution. This status affects the transmission order and timeline, and the changes populate back through the system. For example, should a number of recipient sites be unable to receive the media file at the time they are intended to receive transmission from the distribution, the system automatically changes the schedule for distribution according to one or more set of rules. The schedule may be changed to the next immediate distribution, or a distribution that occurs the next hour or later to allow those sites change to a favorable receiving status. With this feature of automated transmission, time updating has the effect of optimizing the use of transmission making the system more efficient.

If there is an automatic parameter change, such as in the examples regarding time of transmission described above, other subsystems in the claimed system, such as a contract management subsystem, determine rules for proceeding and adjust data surrounding the media file accordingly. For example, the contract management rules might require the media file to be sent to a recipient site regardless of the receiving status of the recipient site. Alternatively, a rule may define the latest date that a media file may be sent. In that case, similarly, if the latest send-date indicates that the media file cannot be delayed any longer, the media file is required to be sent regardless of the receiving status of the target recipient site in the distribution. Content providers viewing data in the system see these changes in real time and related report data is also changed applicably.

Changes can also be made manually. If parameters for a media file are changed by one of the content providers or recipient sites through the PRI 120 or the ARI 122, the changes can be made anywhere in the distribution chain, including post transmission, because all of the subsystems are integrated. If distribution for the media file has already occurred, an updated media file recipient sites remote locations. This means that the content provider can change the availability dates for an individual media file by logging onto the web, pulling up the data for that particular media file, changing the availability dates, and the system will change the availability dates not only within the system 100 itself, but also at all at the file's destinations. The system sends updated copies of the media file if necessary (over satellite, internet etc.) to perform the updates. Users at the recipient sites can also change data surrounding that asset and the same functions will apply. The system also has rules that allow the content providers to change certain data such as availability windows for the media file, but the recipient sites are allowed to change other data that is applicable to their specific systems, such as price. The identification of which entities are allowed to change which parameter fields can be stored as additional parameters in the media file itself.

This end-to-end visibility and system interoperability enables the system to affect any asset at any part of the distribution and management chain. The claimed system is the only asset management system with this scope and combination of functionality.

One of the functions of the system 100 includes interactive program guide (IPG) metadata authoring. Some prior systems enable users to author IPG metadata, but only the claimed system 100 enables entities to see exactly what that IPG metadata will look like at the eventual content recipient sites system immediately. In addition, the recipient site can see what their IPG content looks like on their own system even before the media file arrives. This is because the system takes the content provider's data and transforms it into recipient site-specific data immediately upon ingestion in process blocks 150-154.

Figure 4:
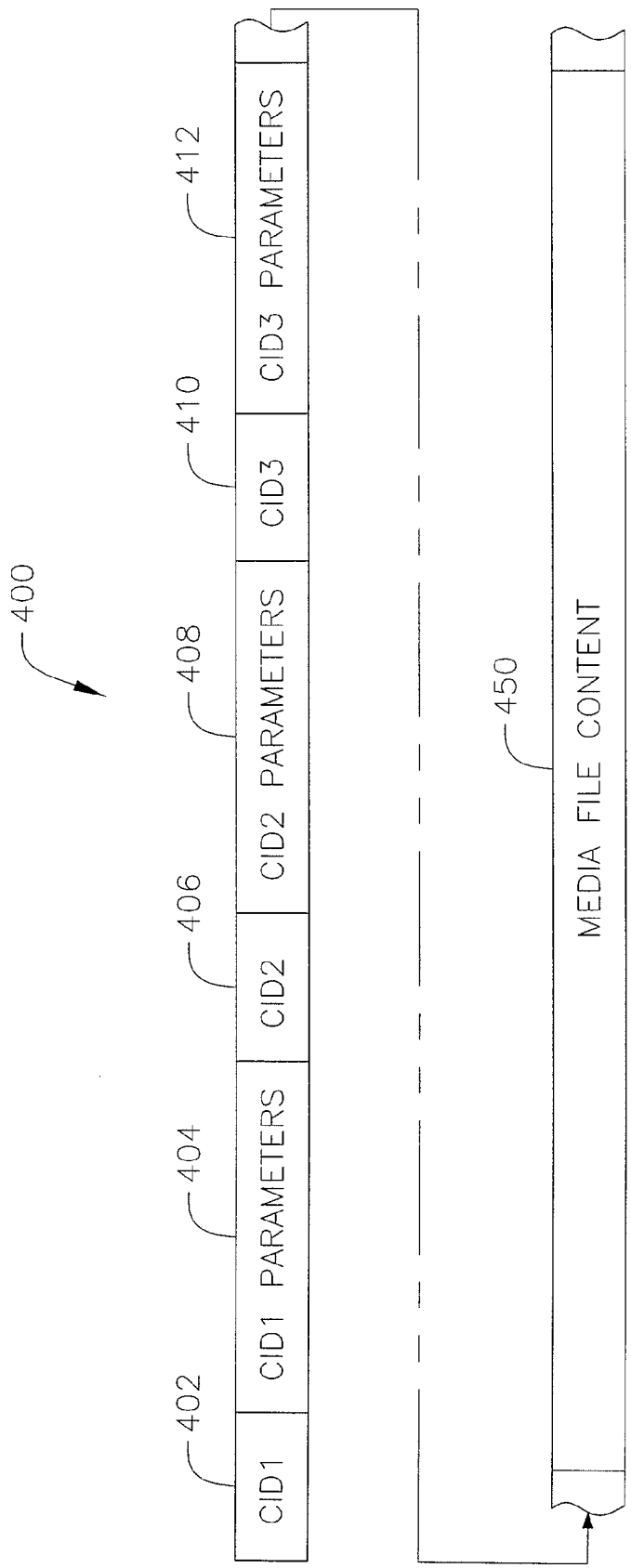
FIG. 4 is a block diagram illustrating field portions of a media file formatted according to one embodiment.

In one preferred embodiment, the system includes a multicast asset data packaging subsystem and method, which is part of the package determination process 152 of FIG. 1. With reference to FIG. 4, a single media file 400 is used for distribution to two or more recipient sites. A first recipient site has first parameter requirements for processing the media file 400, and a second recipient site has second parameter requirements for processing the media file 400 that are different from the first parameter requirements. A first set of parameters 404 is included in the media file that meets the first parameter requirements. Further, a second set of parameters 408 is included in the media file 400 that meets the second parameter requirements. In this regard, the first set of parameters 404 are for use during distribution to the first recipient site, and the second set of parameters 408 are for use during distribution to the second recipient site. Similarly, a third set of parameters 412 is included in the file to meet the parameter requirements of a third recipient site. Each of the first 404, second 408 and third 412 sets of parameters are each identified by customer identifiers 402, 406 and 410 respectively in the media file 400. The media file 400 includes a main body portion, wherein the actual media file content 450 is stored for eventual presentation in a recipient site viewing system.

In this sense, the system 100 has the ability to superset (combine multiple media files into one larger multicast file encompassing all the data of the disparate media files) customized metadata for a recipient site, as well as delivery and interface parameters into a single media file 400. To multicast means using a single transmission of a digital file to multiple reception points simultaneously. The claimed system allows a multicast channel to be used in a more efficient manner, and to centralize coordination of all remote recipient site requirements. Referring again to FIG. 1, the system also allows a single docking station 186 to offload files to a discrete list of destinations without having to send the media file 400 to all of those destinations.

This structure of the media file 400 allows for use of a method of distribution whereby the same file is sent to all applicable receiving sites at the same time. In one embodiment, the media file 400 is a media or digital file for use in video playback, gaming or any other digital file. This file 400 is sent over a satellite link (190 in FIG. 1), the Internet, or the like, from the central system 100 to a local server. It arrives on that server and is moved to a server for a receiving customer when a data control file arrives for the media file 400. The data parameters and/or files required by each site are built into one aggregate media file 400. Each section of that file 400 is targeted for a specific receive site, thereby keeping the localizing functionality, but requiring only one media file 400 to be sent over the multicast. The receiving site's equipment need know only the site's unique customer identifier 402, 406 or 410 in order to extract the proper parameter data set for its use.

In this since, the data within the media file 400 is customizable by recipient site. For example, the price of the media file 400 or menu location being used by the on-screen guide can be recipient site-specific for each receiving recipient customer site. Further, the media file 400 itself can appear to have multiple formats (XML, iTV, or any other widely accepted digital format), even though the specific format of the file as used by a recipient site is part of the larger aggregate of the file 400, thereby enabling interaction with any format of receiving site.

The media file 400 also contains, for each recipient site as part of the parameters 404, 408, 412, interface and delivery specifications unique to each recipient site. Examples include the specific IP address for each recipient site's video server, the interface protocol required at that site (ADI, WINDOWS®, FTP), the version of metadata file required at that particular site (XML, iTV), and how the media file 400 should be processed after it is transferred from the central system 100 to the receiving customer (e.g., delete immediately, stay on the system server for 24 hours etc.) as indicated by the parameters 404, 408, 412. This information tells the recipient sites how to react to, and act on, each file 400 it is receiving individually. This enables recipients to be unrestricted in their interactive behavior since the site itself no longer requires parameters to be set within it, but rather can adopt asset-specific parameters each time a file 400 arrives because of the control information contained within that file 400 by virtue of the parameters 404, 408, 412. This enables functions such as prioritizing files, wherein a media file 400 can be prioritized so that it jumps ahead in the sequence of transfer to the server it will reside on if it is a time-sensitive title. Or, the system enables a site to change the delivery address of its video on demand (VOD) server without having to stop the system 100 from offloading while it is reconfigured, since the parameter information is in each title as it arrives. This parameter information 404, 408, 412 is contained in the header of each data file 400, and is populated by the system each time a file 400 is built for distribution. This enables a receiving server to receive located at a site-specific control information on a file-by-file basis without that information having to be stored in the recipients data file, which, in some cases would violate industry standards. The header is stripped off the file before storage in the file to the recipient site's system.

This aggregation of the site-specific media data and delivery properties also has the effect of making a change at the centralized asset management system instantaneously applicable to any, or all, remote receiving and distribution sites without having to configure files for each site individually, or at the recipient site equipment itself.

In one embodiment, software is used to implement the asset data packaging subsystem to create the media file 400. With reference back to FIG. 1, the steps performed by the software and the flow of data through the system components are illustrated. At process block 104 generalized metadata control file is ingested into the system for each media file 400 that the system is expected to distribute to customers. This control file contains information specific to the media file 400 itself and, as such, is not specific to any recipient customer needs. At process block 150 this control file is transmitted by the system and checked against expected values that the media file 400 is allowed to have (e.g., ESPN would not be allowed to enter into the system titles with an "X" rating), and the values are all normalized, that is, transformed into values the system can recognize and can key other functions off of. At process block 152, the media file 400 is then run through a series of transformations, one for every customer recipient site it will be transmitted to. The parameters are stored as site-specific data for each of those customers in the media file 400. At process block 154, by way of example, and not by way of limitation, these transformations include changing any provider-specific information, such as a product type, into a value desired by the recipient, applying the recipient site's correct price and royalty information, applying the correct content category, and transforming the raw data itself into the type of file each recipient site requires as each of their servers may be built on different operating systems.

When transmission occurs, the finalized information for each recipient site is aggregated into one file 400 containing the data and applicable file structure for every site to which it will be transmitted. The media file 400 is built as a contiguous series of these site-specific control files, or sets of parameters 404, 408, 412, each in the recipient's own site-specific format, containing site-specific control information and control data. At process block 158 this file 400 is subsequently queued, process block 156, and transmitted to each recipient. At each recipient site, the file 400 is searched for the applicable site-specific section(s). For each recipient site, the relevant section is extracted and stripped of any encompassing transmission-only control data portions. This leaves only the relevant file information in the proper format for each specific site, ready to be processed.

In this process, the remote site devices at the recipient sites need only know their assigned customer identifiers 402, 406, 410 in order to search the aggregate file for the recipient's relevant section and to extract the right parameters they will use to process the media file 400. This allows the control data for every distributed device to be modified and controlled at the centralized system, eliminating the need for data to be kept on remote servers or for extensive configuration changes to occur before transmission.

In one embodiment, the claimed invention is a system and method for automated validation of a media file 400 for distribution. A media file 400 having an asset type is received for distribution. It is validated according to one or more requirements for the asset type. As a result of the validation process, one or more errors typically are produced. These errors are corrected by applying a rules application to the media file. The media file 400 is then distributed.

With reference again to FIG. 1, in one embodiment, processing and validation includes polling (process block 104), parsing, validating, normalizing, rules application, error checking (process block 150), package determination (process block 152), site-specific data transformation (process block 156), scheduling (process block 156), transmission (process block 158), and finally, reconciliation and tracking of the media file 400. In one embodiment, the system 100 receives the media files 400 by polling. Polling is the automated receipt and scanning of content into the system. The system constantly signals all points on its network to determine if a media file has been input to any of them. If any media files 400 are found for input, the system downloads them, at process block 140.

Parsing is the automated determination of the file type for each media file 400 coming into the system, and the application of the proper procedures to that media file based on the file type. Validation is the determination of whether the incoming parameter data values and asset types match the expected incoming parameter data values and asset types based on certain criteria such as the inputting party or file format. The system also checks for file-specific required constructs in the incoming data such as allowable lengths, time formats (24 hours vs. 12 hours) and ID structures such as Cablelabs requirements of 20-digit ID values.

Normalization means taking the validated incoming data and transforming it into system-specific formats and values so the data can be acted upon further by the system 100. For example, date transformations occur for the recipient sites to provide a baseline from which to transform the media file 400.

A rules application processes the media file 400 through a complex rules engine that is specific to the system 100 that enables the system 100 to set parameters and to format the media file 400 as necessary for further distribution to receiving customers. As an example of this rules application process, if a specific set of data contains specific values in certain fields, the accompanying file is priced at a certain level at some recipient sites but not at others. If a media file 400 enters the system priced at $2.99 instead of, $3.99 from a particular movie studio, the system determines that the media file 400 is a "special" title for example, a higher standard price such as and therefore changes the data set it applies to the media file for the recipient sites. Some of the receiving sites might elect to make any media file available the standard price via their cable system, but others might decide to follow the lead of the studio and price the title at the special price.

In another example, a rule can be used to define that, if a certain content provider refuses to populate certain fields within the metadata, such as the content package description, the system uses other mandatory fields, such as the provider name and price, to analyze the media file, for example, divine that the package must be a specific package from a certain provider. The system 100 then has the ability to run normal receiving site transformations on the media file 400 for distribution. In summary, the rules engine applies intelligent rules to the data once it has been validated and normalized as the first part of ingestion.

In the process of error checking, the system 100 determines whether the incoming media file 400 is free of errors and unexpected values, and therefore whether the media file is ready to be approved for processing.

In the process of package determination, at process block 152 in FIG. 1, each media file 400 is assigned to a specific content package based on parameters in the media file's metadata. This assigned package determines the distribution list for that media file 400.

The process of site-specific data transformation, a process block 154, transforms the media file 400 into data requested by each recipient site in order to be applicable to their system-specific hardware, software, marketing wishes, and such.

With reference again to FIG. 1, in one embodiment, the claimed invention is a system and method for automated determination of priority in processing a media file 400 for distribution to a recipient site. A media file 400 is received for distribution, at process block 140. The media file 400 is processed to produce data parameters for distribution, process block 150. As part of the processing step 150, a receiving status of the recipient site is checked. One or more of the data parameters are changed according to the receiving status of the recipient site. For example, according to one embodiment, the data parameters are changed according to a set or rules defined in a contract with the recipient site. The media file 400 is then distributed to the recipient site according to the data parameters. Further, an interface is provided so as to allow the recipient site personnel to view status information regarding distribution of the media file 400.

In one embodiment, the claimed invention is a system and method for optimizing distribution of a media file 400 to a plurality of recipient sites. A receive status of a first recipient site is checked, thereby producing a first status check result. A receive status of a second recipient site is checked, thereby producing a second status check result. Based on the first check result and the second check result, a rules engine (process block 154 in FIG. 1) is applied to determine a priority for distribution to the first recipient site relative to the second recipient site. The media file 400 is then distributed to the first recipient site and the second recipient site according to the determined priority.

The system 100 is the first asset management system to prioritize, reorganize and intelligently manipulate a multicast pitch, which is a single transmission of a media file 400 to multiple recipient sites simultaneously. The system transmits media files 400 over a satellite or Internet protocol data network based on a schedule. The schedule is derived based on when the need of the media file 400 is to be transmitted to the recipient sites. This transmission is a multicast transmission to a pre-determined combination of destinations, each with varying ability to receive media files 400 based on the equipment status at each recipient site. One unique feature of the system 100 is its ability to optimize distribution efficiency by accounting for these status changes across its network and then reconciling those status changes with intelligent rules.

For example, if a recipient site in a distribution list for a specific multicast transmission of a media file 400 is not functioning at the time transmission is scheduled for that media file, the system 100 applies intelligent rules to determine whether that transmission requires alteration. In one embodiment, one of those rules defines a minimum percentage of recipient sites that must have a "good" receive status before allowing transmission of the media file. The system's automated decision-making process takes into account whether a non-functional recipient site has not received the media file 400. The media file 400 can be retransmitted to that recipient site later. Alternatively, the system may delay the entire transmission for a set period of time. These decisions are based on rules derived from individual recipient sites (e.g., ability to receive files at that moment) and asset properties (e.g., time left before the specific asset is required to be transmitted to its customer base), as well as other relevant states (e.g., transmission speed, quality of the channel).

In one embodiment, another circumstance that causes a status change to the media file 400 is the manual alteration of the transmission schedule. The system 100 determines whether the change will have an undesired effect on another transmission or file status for a different media file 400. Additionally, the system can predict when future transmission problems may occur, by calculating the performance of network components (e.g., bandwidth, speed, current transmission load), or anticipating upcoming requirements that may cause transmission failures. If a problem is predicted, the system adjusts the schedule accordingly.

Figure 5:
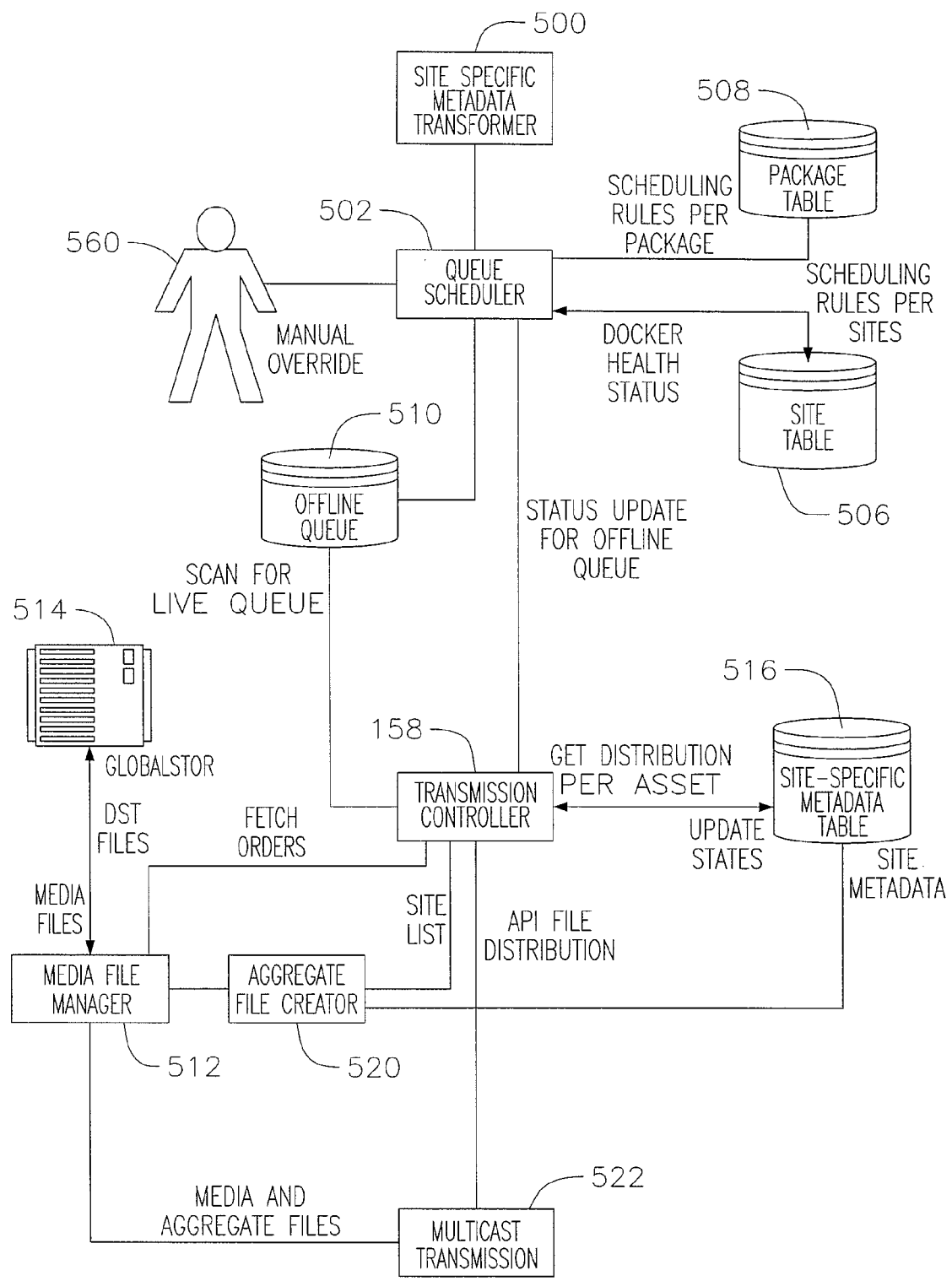
FIG. 5 is a network block data flow diagram illustrating components and method steps in a transmission "sub system" and method according to the embodiment illustrated in FIG. 1.

With reference to FIG. 5, a transmission specific flow diagram is shown that illustrates the data flow in performing prioritization and transmission of the media files 400. Some of the components in FIG. 5 are also shown in FIG. 1 with respect to the overall system. The transmission flow begins with the site-specific metadata transformer 500 passing data to the queue scheduler 502. The queue scheduler 502 applies scheduling rules to each incoming media file 400 based on rules located in both the package tables 504 and site tables 506. These rules include a date range for pitch, a potential time range, priority, channel requirements, and such. Once the scheduler has the pitching parameters for an individual file 400, it passes a reference to that asset to a queue table, which will store it in a preliminary pitch order. This table is also viewable through the ARI 122 and PRI 120, wherein users 560 can enter manual overrides, reprioritizations and re-pitches. This table is periodically scanned by the transmission controller 158. The transmission controller 158 uses an offline queue 510 to instruct a media file manager 512 when to begin fetching media files from a media file data store 514, and to route them to a pitch drive. The controller 158 then calls site-specific metadata tables 516 to aggregate metadata into the media files using a media file creator module 520. When the parameters are properly packaged in the media file 400 for transmission, the final file distribution list is sent to the multicast transmission subsystem at process block 522.

The transmission subsystem is constantly sending and receiving status data across its network. While the system 100 is aggregating the network "health" information, it is applying what it finds to the list of media files 400 it has in its distribution transmission queue 510. Each media file 400 to be distributed has site-specific parameters 404, 408, 412 that need to be taken into account, such as the earliest or latest it can be sent in order to meet its usability requirements.

In another example, if the system 100 determines that a certain percentage of the receiving devices for a certain media file 400 are not on-line at the derived transmission time, the system applies that knowledge against a rules system. The system then determines if the media file 400 still has time to be delayed. It takes that information and looks at the next media file 400 in the transmission queue. If the distribution group of recipients for that media file is 100% online, it will transmit a different media file 400 instead, saving the problem media file 400 until such time as its distribution group is back on line for receiving. Alternatively, the file may need to be transmitted to whatever recipient in the distribution group is capable of capturing it due to timing constraints. This intelligence, combined with the ability to manually adjust the queue 156, gives the system the unique ability to maximize the efficiency of its distribution bandwidth. There is a finite amount of content that can be sent in any timeframe, and the ability to transmit only when the highest percentage of targeted recipient sites can accept the media file 400 minimizes the need to retransmit files and maximizes the finite bandwidth available to the system.

Figure 6:
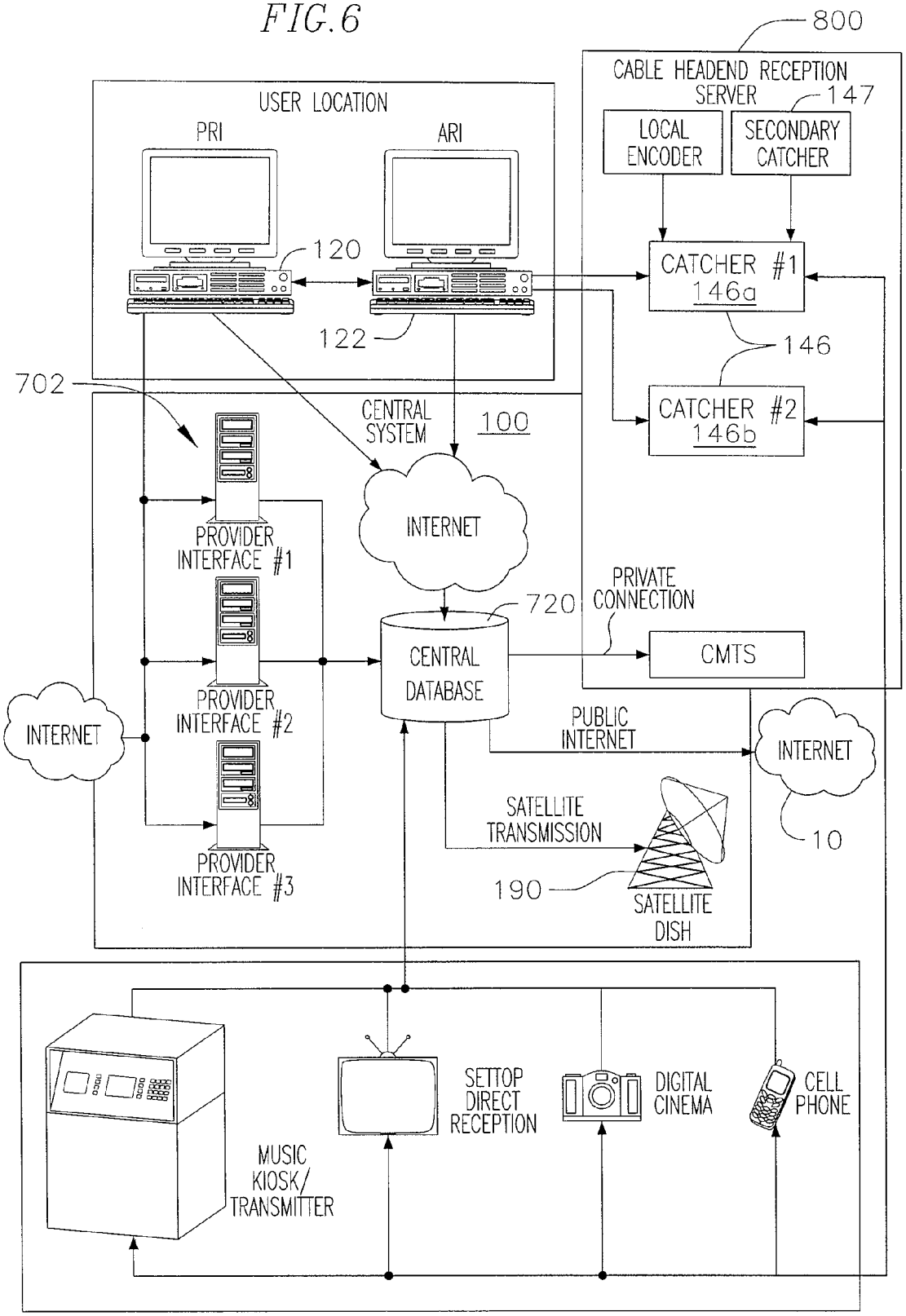
FIG. 6 is a network block data flow diagram illustrating data flow between content providers, catchers, and a data store, according to one embodiment.

Referring now to FIG. 6, in another embodiment, the claimed invention is a system and method for providing connectivity in a media file distribution system 100. The system includes a data store 720, a portion of which is for storing a media file 400 received from a content provider 702. A database in the data store 720 contains editable parameters for distribution of the recipient site. The PRI 120 provides an interface to the database and allows the content provider 702 to edit the site-specific parameters 404, 408, 412. The ARI 122 further allows the recipient site to edit the parameters. The distribution subsystem is configured for distributing the media file 400 according to the site-specific parameters, 404, 408, 412. In one embodiment, the distribution subsystem includes connections to the Internet 10 and/or to a satellite communications link 190.

The system allows customers at either usage end—i.e., receiving sites providers 702 and—the unique ability to view, edit and assign parameters 404, 408 412 to a media files 400 in either their own or the other's system. The claimed system 100 enables both content providers 702 and recipient sites to gain information relevant to their product and make relevant changes to their media files 400 within a single system. The system is implemented by receiving edits and acting on the actual source media file 400 itself.

In one example, if a content provider 702 wants to assign an approval for a certain recipient site to acquire its programming, a content provider 702 can do so remotely through the PRI 120. If the recipient site signs up for that content, which can also be done remotely through the ARI 122, the system 100 automatically requests parameters for assigning to the file for the recipient site (such as price, on-screen guide placement category, provider value), and it completes the transaction without any manual intervention. The content providers 702 supply information about the content, such as the parameter values with which each file will arrive (suggested price, suggested rating, and such). The receiving site can assign its desired site-specific parameters 404, 408 412 to the file 400 as well through the ARI 122. The content provider 702 can display the parameter information and view exactly how the content is being offered to that particular receiving site's customers through the PRI 120.

Figure 7:
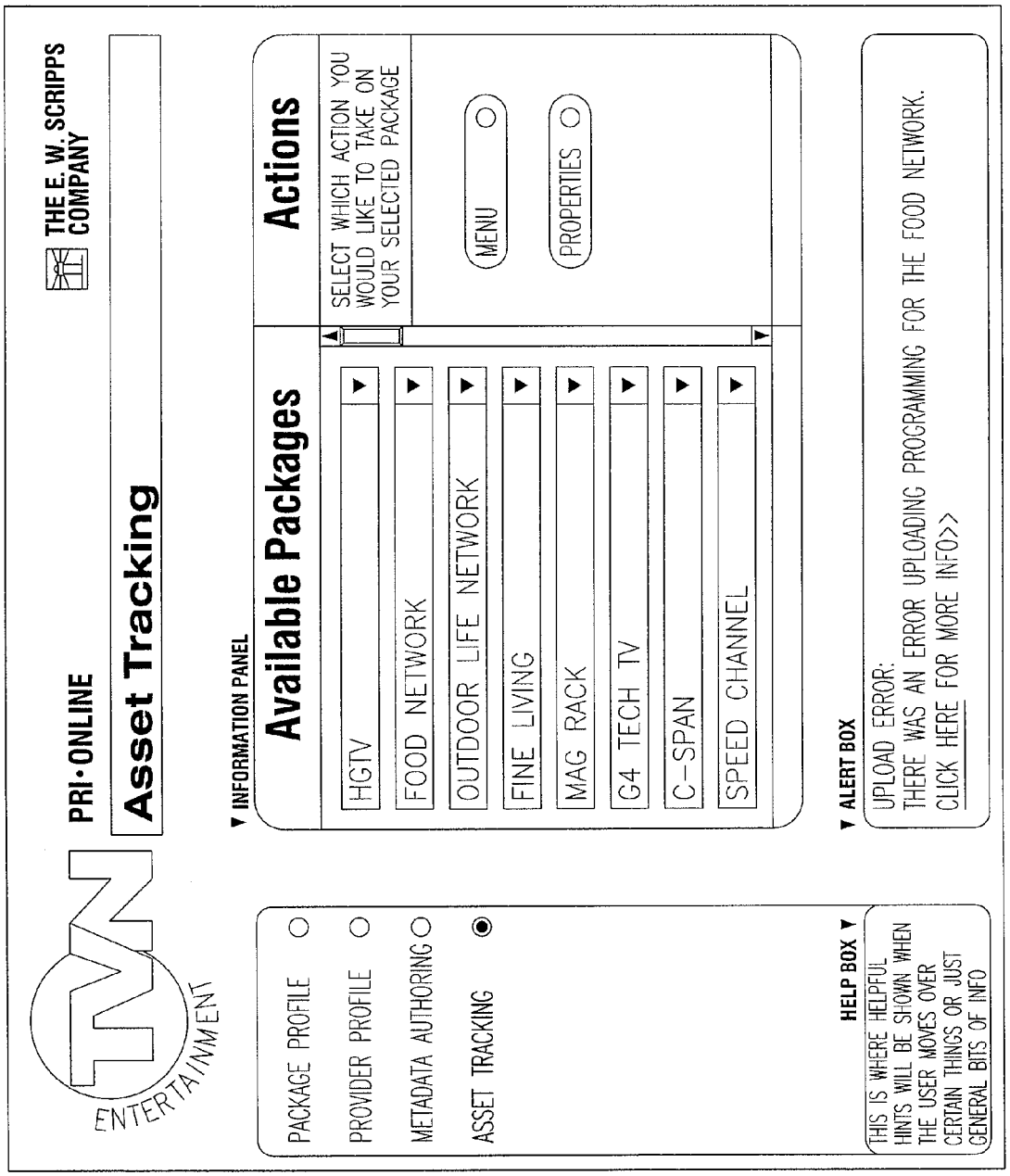
FIG. 7 is a screen shot from an example asset tracking interface for a content provider for the system and method of FIG. 1.
Figure 8:
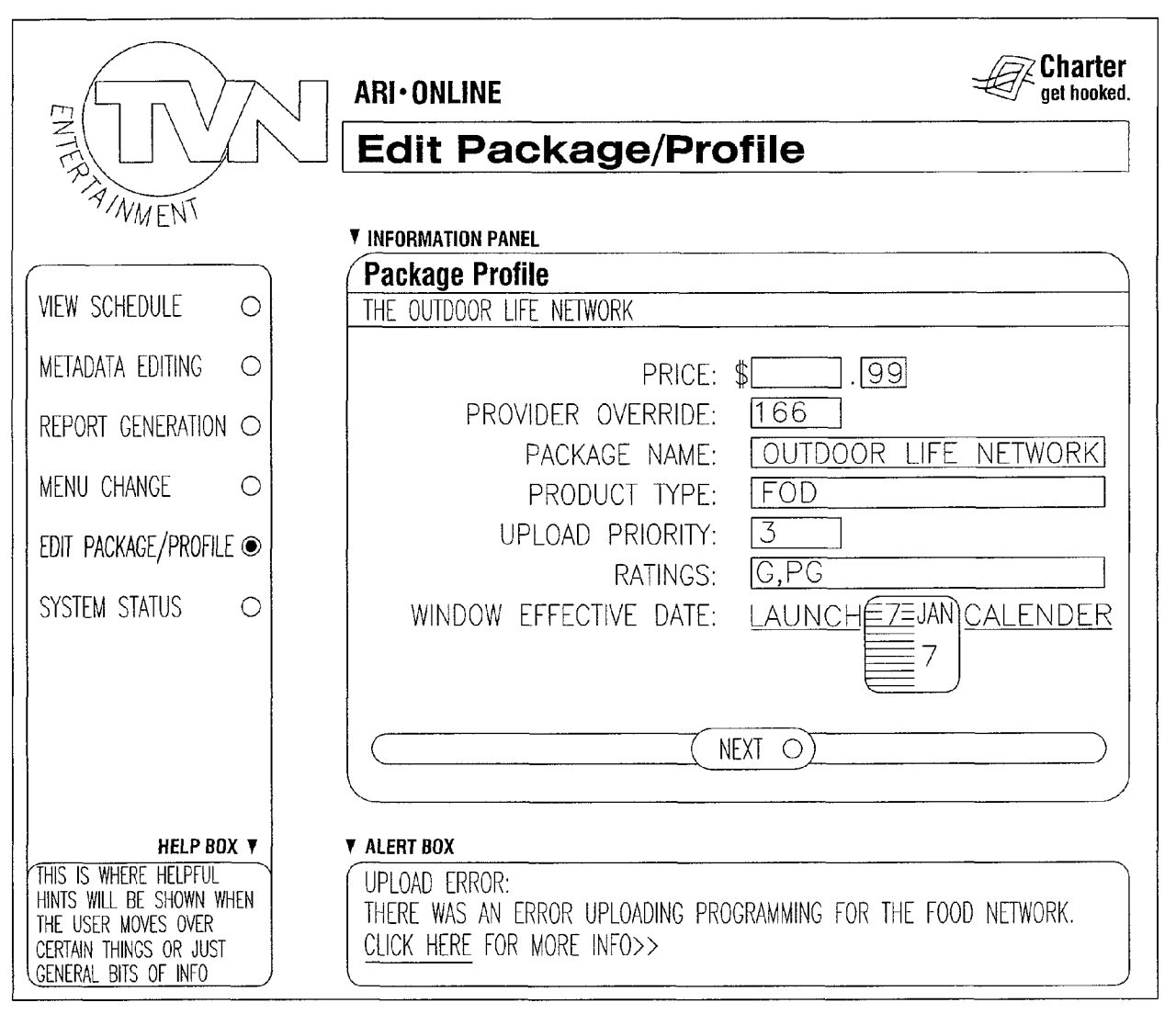

Another example screen shot of the provider interface into the system 100, the PRI 120, is shown in FIG. 7. In the screen shot of FIG. 7, the provider is shown a list of available media packages for media files 400 stored in the data store 720. Another example screen shot from the ARI 122 is shown in FIG. 8. In this screen, the recipient customer can enter pricing information, package name information, a product description, transmission priority, and rating information for the package, which are customizations that can be viewed, edited, and/or validated by the content provider 702 in the ARI 122 in a similar screen. In this way, because both content providers and recipient sites have access to data within the system applicable to each other, they are able to view and change the data for customization to their own systems. Content providers 702 are able to authorize a recipient site's ordering of a package containing the content provider's media file 400, and the system eliminates the need for manual assignment of that recipient site into the transmission distribution list for the media file 400. Given that a preferred embodiment of the ARI 122 is web-based, and runs in a standard browser window, the recipient sites are able to view and edit the metadata associated with the media file 400 over the Internet, which allows them to set the data without having to create their own separate system to do so.

In another feature of the system, when a content provider 702 submits content into the system (i.e., the content provider 702 sends a media file along with the controlling metadata file with its appropriate asset-specific information), the media file 400 is checked against expected properties and approved for ingestion into the system, as described above. These properties and values are then, through a series of steps, modified to the individual requirements of each individual recipient site wishing to receive that content, as described above. Those site-specific values are then assigned to that recipient site within the central database in the data store 720, and displayed to the customer prior to transmission. The recipient site has the ability to change any values prior to transmission through the ARI 122.

In one embodiment, the site-specific parameters 404, 408, 412 follow certain expected criteria and value ranges. Automated assignment of at least some of those values is triggered by the expected input values and assignment of others is triggered by the expected outbound values for the site-specific parameters 404, 408, 412 of the media file 400. The system 100 allows the recipient sites to see the inbound media files 400 in order to transform it from 100 any way they see fit. The system also allows the inputting customers, i.e., the content providers 702, to see the results of their data being transformed by the recipient sites. Since both sets of data reside within a single data store 720, it is possible to display both sets to users at either end of the distribution chain. This gives both content providers 702 and recipient sites each more visibility into what the other is doing with their half of the distribution chain. It also gives them more control. A content provider 702 can assign contract values or on-screen display values to a particular video asset in a media file and restrict the recipient sites to which the media file is made available from changing those values. The content providers can then see the end result by looking at the actual data within the system. They can also authorize or de-authorize specific recipient sites within the system for receiving an media file 400 in the first place, simply by logging into the system and assigning parameters to their content, such as which recipients can or cannot receive particular media files 400.

Recipient sites can see the incoming values the content provider 702 makes available with the content providers assets and then the recipient sites can set up transformations to those assets prior to or after transmission to its own equipment. The recipient sites can stop specific media files from coming to their system if the media files for those assets contain certain data types (such as those with an "X" rating, and the like.). A recipient site can request certain media files if they have not already been authorized for them, and they can track the input delivery timeframes to see whether a media file will be transmitted as expected. This ability to act on the actual data inputted by the content providers means the system is the only place participating content providers and recipient sites need to view, enter and edit the parameter data, and it gives them the ability to do so at any point in time along the media file 400 asset lifecycle.

In another embodiment, the claimed invention is a system and method for providing interactive program guide entry for a media file 400. A distribution hub (data store 720 in FIG. 6) stores a media file 400 received from a content provider 702 for distribution to a recipient site. An interface to the distribution hub (ARI 122) allows editing of program guide data for the media file. The interface stores the program guide data as site-specific parameters 404, 408, 412 to the media file 400. The interface further allows the content provider to view the program guide data for the media file 400. In one embodiment, the interface further allows the content provider 702, through the PRI 120, to edit the program guide data, and to set parameters regarding editing of the program guide data by the recipient.

As discussed above with respect to FIGS. 2, 3, 7 and 8, the system has web-browser based graphical user interface (GUI) functionality. Further built in to this GUI functionality is the ability to allow entities (i.e., either content providers or recipient sites) to easily manipulate their interactive program guide (IPG), or on-screen TV set navigation guide. The interface allows the recipient to structure and map incoming media files 400 to their interface.

For example, in one embodiment, when a viewer on a recipient site's network enters a video-on-demand (VOD) section of the recipient site's television IPG, there is a hierarchical menu through which to navigate via the remote control organizing all of the video files by category. The recipient site (e.g., cable company or telephone company.) maps every asset it receives on its video-on-demand VOD servers to an IPG menu location prior to the asset's arrival within its system, and the data files accompanying each digital file preferably contain this information. The claimed system graphically links the content provider 702 and recipient site's IPG. This enables the recipient site to do the manually intensive mapping process on an easily manipulated graphic user interface, available in the ARI 122. Through the same interface, the system also provides the ability to link incoming content providers' menu data to IPG menu.

A media file 400 sent by the system to a recipient has a field in the site-specific parameter 404, which carries the hierarchical menu data that defines the destination on the recipient site's IPG. This IPG might be displayed, for example, on a television, set-top box, web page, phone or any other electronic system. The media files 400 being input into system by the content provider 702 contain a generalized value in this field, used more as a characteristic of the asset contained in the media file than an expected display value. This generalized value is transformed into a specific value for each recipient site to use in processing the media file 400 which, in one embodiment, comprises taking any expected potential incoming menu value and performing a site-specific transformation (per recipient site) on it, based on previously entered information about the recipient site's IPG. Current systems do this by taking a text menu string of incoming data and transforming it into an outgoing text string. This requires repeated entry (manual or automated depending on the systems) of the strings per each incoming type and for each recipient site. This is no longer required when using the claimed system.

Figure 9:
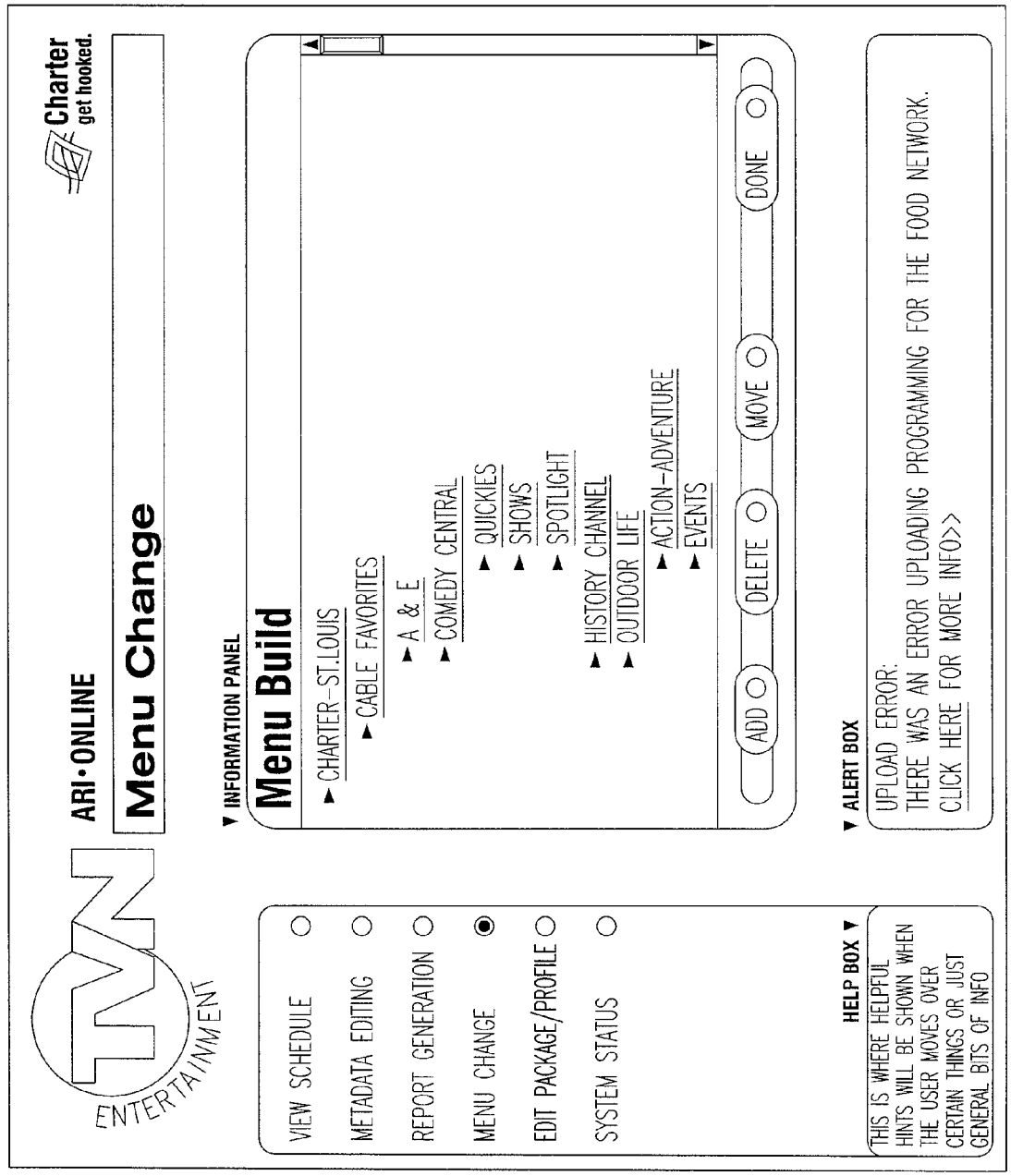
FIG. 9 is a screen shot from an example interactive program guide editing interface for a recipient site for the system and method of FIG. 1.
Figure 10:
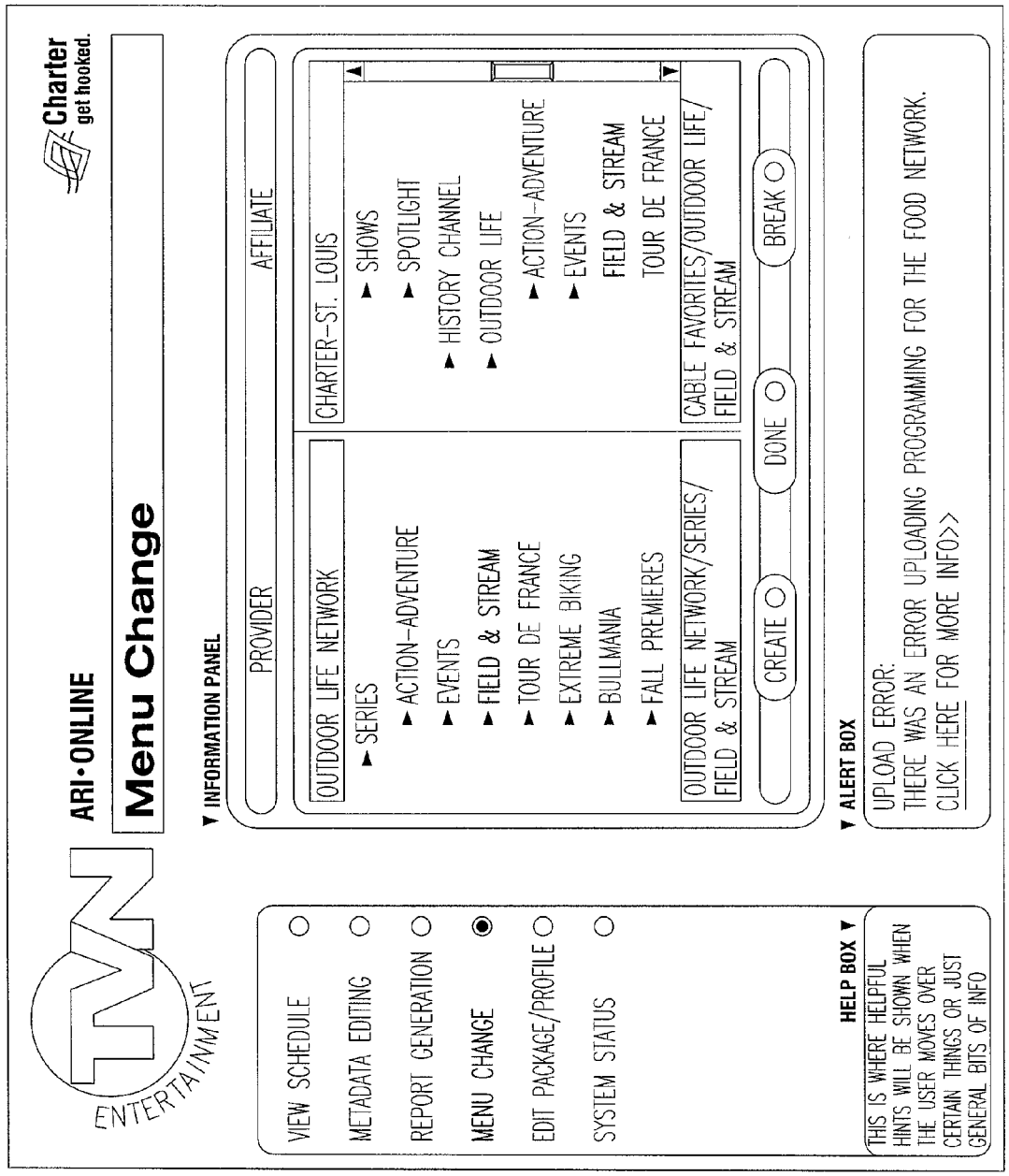
FIG. 10 is another screen shot from an example interactive program guide editing interface for a recipient site for the system and method of FIG. 1.

With reference to FIGS. 9 and 10, example embodiments of IPG editing screens that can be presented from the ARI 122 are shown. A graphical menu builder provides easy IPG entry into the IPG parameters 404 of the media file 400. Recipient sites have the ability to enter, map, move, replace, delete and populate menu locations through this easily usable interactive GUI. FIG. 10 illustrates the screen shown after selection of the "Outdoor Life Network" entry in the screen show in FIG. 9.

Referring back to FIG. 1, in another embodiment, the claimed invention is a system and method for providing a multi-port catcher 146. The system includes a computer 108, a data store 514 (or 720 in FIG. 6), and a network connection 106 for connecting the computer to a network. In one aspect of this embodiment, a partition application is executed on the computer 146 to partition the computer into multiple partitions. A catcher application 146 (a remote receiving computer that receives and rebuilds the transmitted files) executes in each partition. Each catcher application 146 is capable of receiving a separate media file 400 over the network connection, simultaneously. Each media file 400 is stored in the data store 514. The system may use a plurality of catcher applications 146, wherein, for example, a first partition executes a first catcher application 146, and a second partition executes a second catcher application 146. Therefore, the first catcher application 146 can use a different protocol than the second catcher application 146. In this sense, the partition application is configured to divide processing of a processor of the computer into virtual computers, such that each of the media files 400 is received by a partition executing on one of the virtual computers.

In one embodiment, one of the partitions is configured as a content provider itself, such that one or more of the media files 400 can be provided internally from the data store into the catcher 146 without using a separate computer 108 to provide the one or more media files 400 to the catcher 146. In this or other embodiments, one of the partitions is further configured as a gateway computer to provide gateway processing, such as SMTP 144, FTP 148, and/or encoding/off-loading functions 149, for each of the other partitions.

In one embodiment, the catcher 146 is implemented as a file reception server 800 located at a recipient customer location or cable head end, executing catcher partitions 146*a* and 146*b*. The system 100 allows one catcher 146 to receive multiple asset reception streams/transmissions from multiple distributors, all organized and reported on from the centralized database in the data store 720.

In current digital video distribution networks, a "catcher" has one reception path that validates and offloads the received files onto the destination server for the received files (the recipient sites equipment). The partitions 146a and 146b on the catcher 146 enable multiple, unique, exclusive reception paths for multiple transmission systems to deliver media files 400 to it. The media files 400 are treated uniquely based on their origination point, but the data is entered into the central data store 720 (by way of the catcher sending it back to the central system), giving one point of reference to the recipient site. This is unique because previously, any recipient site that required content delivered from multiple sources required multiple catchers (one per source), and a separate physical gateway to manage the multiple offloads into one destination video server. The catcher 146 of the presently claimed system is capable of not only receiving multiple inbound transmissions from different sources on the same hardware platform, but it is also capable of performing the gateway traffic management function, thereby consolidating previously disparate functions into one. The catcher 146 also includes the ability to ingest a local media file 400 without the need for it to be transmitted from a remote destination.

In order for the catcher to perform these functions, a software application executes internally in the computer to partition a single computer into multiple receiving points 146a and 146b. Each partition has the ability to execute industry standard file-movement protocols within the same computer 108. This allows the catcher 146 to receive multiple streams from different satellite receivers, from locally introduced content over an IP network, or from another catcher 147 physically attached to the catcher 146. The media files 400 are offloaded from the catcher 146 through one point, eliminating the need for the recipient site to put a separate gateway on the network. The media files 400 are aggregated into the centralized data store 720, thereby allowing the recipient site to perform data manipulation and reporting from one system regardless of the origination point of the transmission.

In one embodiment, each catcher 146a, 146b is implemented in software. This software scans both internal folders in catcher 146 and external folders on the network to which the catcher 146 is attached. These files are brought into a staging area/folder in the catcher 146. The metadata associated with those files (which arrives with the files) is sent back through the Internet to the centralized data store 720. With reference back to FIG. 1, the metadata is then scanned for compliance, process block 150 in FIG. 1, which includes analyzing the media file 400 to determine the identity of the content provider 702, and normalizing the site specific parameters 404, 408, 412 into a standard set of values the recipient site has requested. The parameters 404, 408, 412 are stored into the multicast structure, and the data is re-sent to the catcher 146. The system then moves the submitted digital file 400 off of the central data store 720 onto the recipient site's video server. Should a media file 400 that is not allowed or expected arrive on the system catcher 146 from an outside source, the file is quarantined on the catcher 146 and not moved to the central data store 720.

The centralization in the system allows the recipient site to view all of its digital file parameter and media data in one central place, and also allows it to use that same system to update media files 400 across the entire set of sites it owns from one place, regardless of whether or not those media files originated from the central data store 720.

In another embodiment, the claimed invention is a system and method for administrating a contract for distribution of a media file 400. A media file 400 is received from a content provider 702, after which, contract parameter data is entered into the media file 400 according to a contract between the content provider and a recipient site. Metadata is calculated for the media file 400 based on the contract parameter data, which is stored in the site-specific parameters 404, 408, 412 of the media file 400. The media file 400 is then distributed to the recipient site. In one embodiment, by way of example, and not by limitation, the site-specific parameters 404, 408, 412 include price limitations for the price that the recipient site can charge viewers for viewing of the media file 400. As another example, and not by limitation, the contract parameter data 404, 408, 412 include time limitations defining limitations regarding a time that the recipient site can present the media file 400.

The contract management system enables functions for the administration of a contract (between any or all of content providers, distributors, recipient sites, studios or other applicable parties) with respect to a media file 400. By way of example, and not by limitation, these functions include a contract to derive N number of unique, site-specific financial parameters for use in multiple places within the system, and the unique use of contract entity building blocks (such as provider, receiver or distributor element) to determine financial fulfillment and processing.

Figure 11:
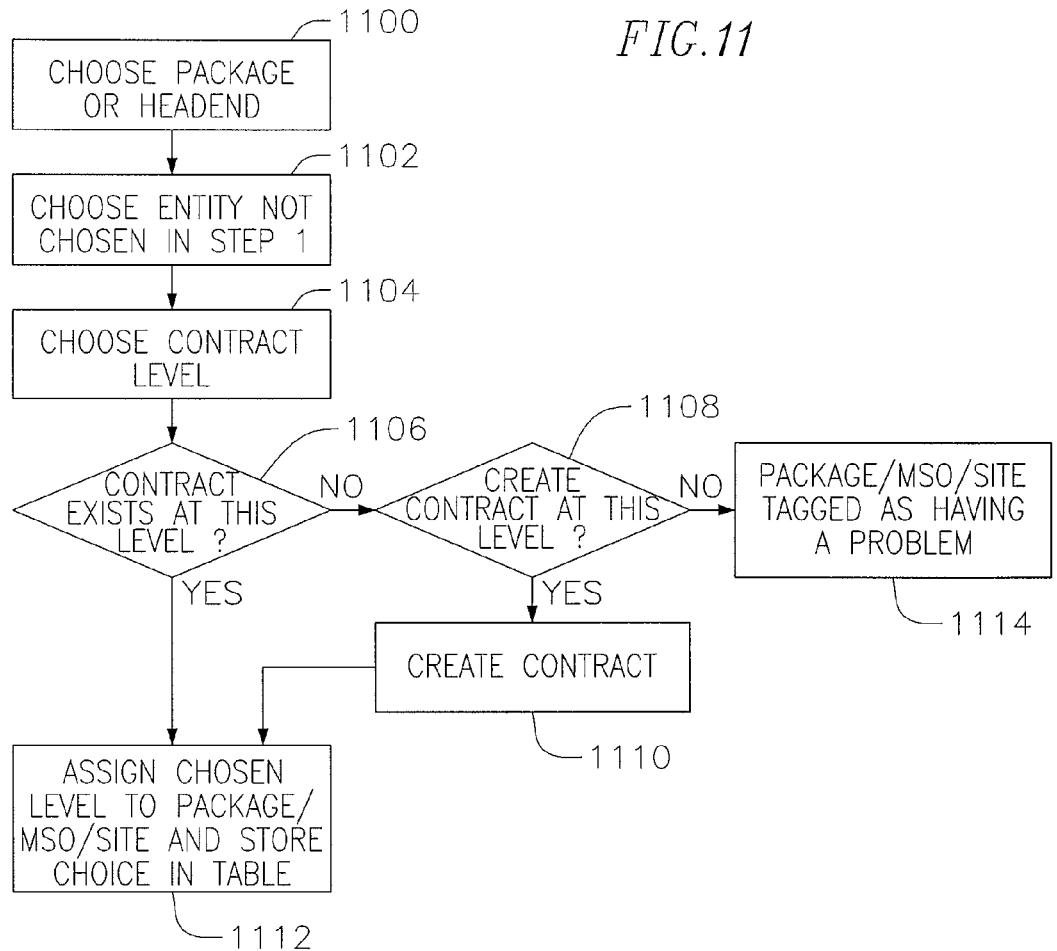
FIG. 11 is data flow diagram illustrating steps performed by a contract manager "sub system" according to one embodiment.

With reference to FIG. 11, in one embodiment, at step 1100, one entity has the option of managing contracts in one of two different ways, either by using package properties or by using site properties of the site-specific parameters 404, 408, 412. Next, at step 1102, a choice is presented to the user for selecting the level not selected in step 1100 (i.e., if the option for package properties was selected, the site properties are selected). With respect to package properties, the user can view the hierarchy of the package recipient sites sorted by MSO, and the recipient sites they each own. The recipient site of content provider 702 can then select any of these groups (the entire set of package recipient sites or any number of MSO's and/or sites) for contract creation or editing. The level to be applied is selected, which includes by package, MSO, or recipient site, at step 1104. If the selected level doesn't have a contract already created, step 1106, the system 100 offers the opportunity to create the contract or contracts, at step 1108. If a recipient site group is selected and applied in bulk by using MSO or package editing, and some of the recipient sites do not yet have a site contract, then one will be created for those that do not already have one, at step 1110. Then all recipient sites under the contract parameters are updated to reflect the choice of contract to use for the sites, at step 1112. Otherwise, if the user chose not to create a contract when there was no contract in place for a package, MSO or recipient site, then those sites that are left without contracts are marked with an error condition in the system, step at 1114.

In one embodiment, if additional recipient sites are added to the package, they do not automatically inherit the contract level choice made in bulk earlier by selecting MSO or Package for contract creation or editing.

In one example using the system, the user can view all packages that exist, and the packages to which a recipient site belongs. If a new package for a recipient site is selected, the user is taken to a contract application level selection screen, where the user can chose contract editing by package, MSO, or recipient site. The user can also select a package for which the recipient site is already a member, and update contract parameters. As explained above, if the newly chosen level doesn't yet have a contract created, the user is offered the choice to create the contract.

In one embodiment, after contract creation, parameter data reflecting the contract is stored in the package tables of FIG. 1. When a media file 400 that is subject to the a contract is processed through the system 100, during the package determination process 152, the package tables are read and the appropriate parameters are inserted into the site specific parameters 404, 408, 412 into the media file 400.

Figure 12:
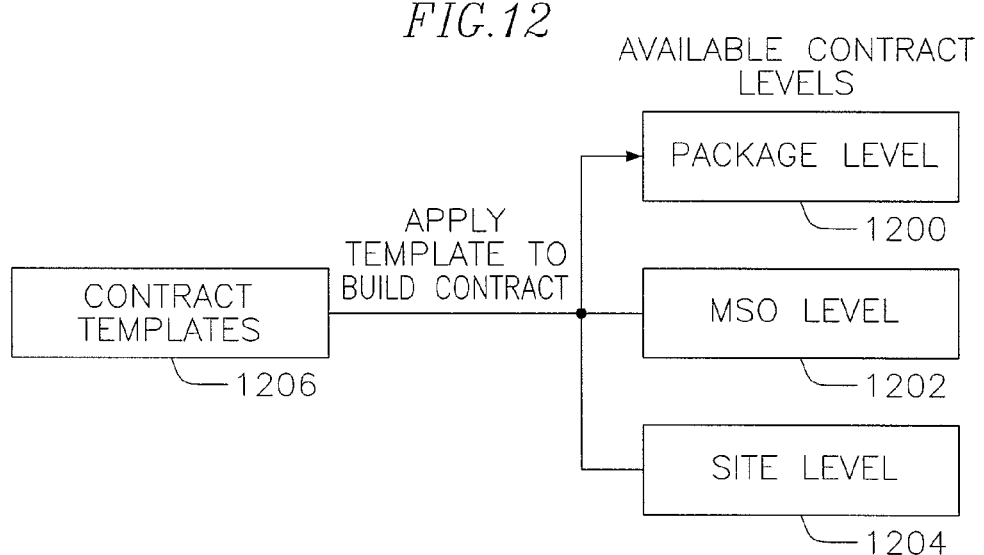
FIG. 12 is data flow diagram illustrating the flow of data for applying a contract template to create contract parameters for a media file according to one embodiment.

With reference to FIG. 12, when choosing a contract level (through site properties) the system 100 shows all three potential levels, the package level 1200, the MSO level 1202, and the recipient site level 1204, whether or not a contract is available on those levels. When the contract level is selected, the system displays an indicator showing whether a contract exists at that level. If a contract is created by the system, initially, a contract template 1206 is used to form the contract, after which, the contract is modifiable.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and mediums are disclosed as exemplary embodiments implementing the claimed invention.

Furthermore, the various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. A method for automated validation of a media file for distribution, the method comprising:
   receiving a media file via a communication network for distribution, the media file having an asset type and a set of parameter data values, the set of parameter data values including information relating to at least one of a price of the media file, a file format, a processing requirement, a program guide entry format, values that are specific to each content provider, identification of which entities are allowed to change which parameter fields, interface and delivery specifications, allowable file length, a time format, an ID structure, on-screen guide placement information, and a rating;
   validating the media file by comparing the received asset type and set of parameter data values with an expected asset type and expected set of parameter data values stored in a computer, according to one or more requirements specific to the media file, the step of validating producing one or more errors or detecting one or more unexpected values in the asset type and the expected set of parameter data values;
   correcting the one or more errors or one or more unexpected values in the asset type and the expected set of parameter data values by applying a rules application to the received media file; and
   distributing the validated media file according to the corrected set of parameter data values.

2. The method of claim 1, wherein said communication network is the Internet.

3. The method of claim 1, wherein said communication network is a satellite link.

4. The method of claim 1, wherein said media file is for use in a video play back.

5. The method of claim 1, wherein said media file is for use in gaming.

6. The method of claim 1, further comprising transforming the validated media file into a specific format and value, before distribution.

7. The method of claim 1, wherein said rules application includes rules for pricing structure.

8. The method of claim 1, wherein said rules application includes rules for populating certain data fields in the media file according to the asset type.

9. The method of claim 1, wherein said receiving a media file comprises receiving the media file by polling.

10. The method of claim 9, wherein said polling comprises signaling all the sending points on the communication network to determine if any media file has been input; and
   downloading any media file that has been input.

11. The method of claim 1, wherein said validated media file is distributed to a plurality of recipient computers, the method further comprising processing the received validated media file by a recipient computer, according to the corrected set of parameter data values specific to said recipient computer.

12. The method of claim 11, further comprising checking receiving status of each of the plurality of recipient computers; and
   changing one or more of the parameter data values according to the receiving status of the recipient computers.

13. The method of claim 1, wherein the set of parameter data values further includes information relating to a transmission protocol.

14. A system for automated validation of a media file for distribution, the system comprising:
   a processor, memory accessible by the processor, and computer program instructions stored in the memory and executable by the processor to perform:
   receiving a media file via a communication network for distribution, the media file having an asset type and a set of parameter data values, the set of parameter data values including information relating to at least one of a price of the media file, a file format, a processing requirement, a program guide entry format, values that are specific to each content provider, identification of which entities are allowed to change which parameter fields, interface and delivery specifications, allowable file length, a time format, an ID structure, on-screen guide placement information, and a rating;
   validating the media file by comparing the received asset type and set of parameter data values with an expected asset type and expected set of parameter data values stored in a computer, according to one or more requirements specific to the media file, the step of validating producing one or more errors or detecting one or more unexpected values in the asset type and the expected set of parameter data values;
   correcting the one or more errors or one or more unexpected values in the asset type and the expected set of parameter data values by applying a rules application to the received media file; and
   distributing the validated media file according to the corrected set of parameter data values.

15. The system of claim 14, wherein said validated media file is distributed to a plurality of recipient computers and the system further comprises computer program instructions stored in the memory and executable by the processor to perform:
   processing the received validated media file by a recipient computer, according to the corrected set of parameter data values specific to said recipient computer.

16. The method of claim 15, further comprising computer program instructions stored in the memory and executable by the processor to perform:

checking receiving status of each of the plurality of recipient computers; and changing one or more of the parameter data values according to the receiving status of the recipient computers.

17. A computer program product for automated validation of a media file for distribution, the computer program product comprising a non-transitory computer readable medium and computer program instructions recorded thereon and executable by the processor for:

receiving a media file via a communication network for distribution, the media file having an asset type and a set of parameter data values, the set of parameter data values including information relating to at least one of a price of the media file, a file format, a processing requirement, a program guide entry format, values that are specific to each content provider, identification of which entities are allowed to change which parameter fields, interface and delivery specifications, allowable file length, a time format, an ID structure, on-screen guide placement information, and a rating;

validating the media file by comparing the received asset type and set of parameter data values with an expected asset type and expected set of parameter data values stored in a computer, according to one or more requirements specific to the media file, the step of validating producing one or more errors or detecting one or more unexpected values in the asset type and the expected set of parameter data values;

correcting the one or more errors or one or more unexpected values in the asset type and the expected set of parameter data values by applying a rules application to the received media file; and distributing the validated media file according to the corrected set of parameter data values.

18. The computer program product of claim 17, wherein said validated media file is distributed to a plurality of recipient computers and the computer program product further comprises computer program instructions to perform:

processing the received validated media file by a recipient computer, according to the corrected set of parameter data values specific to said recipient computer.

19. The computer program product of claim 18, further comprising computer program instructions to perform:

checking receiving status of each of the plurality of recipient computers; and changing one or more of the parameter data values according to the receiving status of the recipient computers.

* * * * *